US009139232B1

(12) United States Patent
De La rosa et al.

(10) Patent No.: US 9,139,232 B1
(45) Date of Patent: Sep. 22, 2015

(54) HOOD SUPPORT ASSEMBLY FOR A WORK VEHICLE

(71) Applicant: CNH Industrial America, LLC, New Holland, PA (US)

(72) Inventors: Luis De La rosa, Queretaro (MX); Abid Hussain, Queretaro (MX); Jose Luis Peralta, Queretaro (MX)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/447,711

(22) Filed: Jul. 31, 2014

(51) Int. Cl.
*E02F 9/08* (2006.01)
*B62D 25/12* (2006.01)
*B62D 49/00* (2006.01)

(52) U.S. Cl.
CPC ............... *B62D 25/12* (2013.01); *B62D 49/00* (2013.01)

(58) Field of Classification Search
CPC ........ B62D 25/10; B62D 25/12; B62D 49/00; F01N 2590/08
USPC ....................................................... 180/69.2
See application file for complete search history.

(56) References Cited

U.S. PATENT DOCUMENTS

| 6,030,029 | A  | * | 2/2000  | Tsuda et al. ............ 296/203.02 |
| 6,588,524 | B2 | * | 7/2003  | Keen et al. .................... 180/69.2 |
| 6,910,545 | B2 | * | 6/2005  | Haun ............................ 180/69.2 |
| 6,929,279 | B2 | * | 8/2005  | Boden ........................... 280/477 |
| 8,230,960 | B2 |   | 7/2012  | Shoen |
| 8,695,748 | B2 |   | 4/2014  | Togo et al. |
| 2008/0121451 | A1 | * | 5/2008 | Kertz et al. ................ 180/69.24 |
| 2011/0167808 | A1 | * | 7/2011 | Kosaka et al. .................. 60/311 |
| 2011/0284308 | A1 | * | 11/2011 | Mariner et al. ............... 180/309 |
| 2014/0020972 | A1 |   | 1/2014  | Masumoto et al. |
| 2014/0083791 | A1 | * | 3/2014 | Togo ............................ 180/309 |
| 2015/0000256 | A1 | * | 1/2015 | Kobayashi et al. ............. 60/282 |
| 2015/0061286 | A1 | * | 3/2015 | Niaz ............................. 285/332 |

FOREIGN PATENT DOCUMENTS

EP         1182119 B1        11/2005

* cited by examiner

*Primary Examiner* — John Walters
*Assistant Examiner* — Brian Swenson
(74) *Attorney, Agent, or Firm* — Sue C. Watson (57) ABSTRACT

A hood support assembly for a work vehicle may generally include a support frame having a front support arm, a rear support arm and a hood support plate coupled between the front and rear support arms. The support frame may further include a first mounting bracket and a second mounting bracket extending inwardly from the front and rear support arms, respectively. The hood support assembly may also include a removable mounting cradle coupled between the first and second mounting brackets. The mounting cradle may include a first mounting flange configured to be coupled to the first mounting bracket and a second mounting flange configured to be coupled to the second mounting bracket. The mounting cradle may be configured to vertically support an exhaust treatment component of the work vehicle between the front and rear support arms.

21 Claims, 8 Drawing Sheets

HOOD SUPPORT ASSEMBLY FOR A WORK VEHICLE

FIELD OF THE INVENTION

The present subject matter relates generally to work vehicles and, more particularly, to a hood support assembly for a work vehicle that supports the vehicle's hood while also accommodating various under-hood components of the work vehicle, such as one or more of the vehicle's exhaust treatment system components.

BACKGROUND OF THE INVENTION

Typically, work vehicles, such as tractors and other agricultural vehicles, include an exhaust treatment system for controlling engine emissions. As is generally understood, exhaust treatment systems for work vehicles often include a DOC system or module in fluid communication with a selective catalytic reduction (SCR) system or module. The DOC module generally includes a cylindrical housing containing one or more catalysts configured to oxidize carbon monoxide and unburnt hydrocarbons contained within the engine exhaust. The DOC housing may also define a mixing chamber for mixing an exhaust reductant, such as a diesel engine fluid (DEF) reductant or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR module to allow the reductant to be reacted with a catalyst in order to reduce the amount of nitrous oxide (NOx) emissions contained within the engine exhaust.

The DOC module must typically be mounted as close as possible to the engine to allow for minimal heat loss as the engine exhaust flows from the engine to the DOC module. However, the DOC module is often quite large, thereby making it difficult to mount the housing within the small amount of open space available within the vehicle's under-hood compartment. As a result, DOC-specific mounting assemblies have been developed that allow the DOC module to be mounted under the hood adjacent to the engine. Unfortunately, conventional mounting assemblies for DOC modules are often complex and/or difficult to assemble, thereby significantly increasing assembly times at the associated vehicle manufacturing plant. In addition, such mounting assemblies are typically configured to only support the DOC module and, thus, do not provide for the most efficient mounting solution given the limited storage space available within the vehicle's under-hood compartment.

Accordingly, a hood support assembly for a work vehicle that supports not only the vehicle's hood but also accommodates various under-hood components of the work vehicle, including the DOC module and/or any other suitable exhaust treatment component(s), would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a hood support assembly for a work vehicle. The hood support assembly may generally include a support frame having a front support arm, a rear support arm and a hood support plate coupled between the front and rear support arms. The support frame may further include a first mounting bracket and a second mounting bracket. The first mounting bracket may be coupled to the front support arm and may extend outwardly towards the rear support arm. The second mounting bracket may be coupled to the rear support arm and may extend outwardly towards the front support arm. The hood support assembly may also include a removable mounting cradle coupled between the first and second mounting brackets. The mounting cradle may include a first mounting flange configured to be coupled to the first mounting bracket and a second mounting flange configured to be coupled to the second mounting bracket. The mounting cradle may be configured to vertically support an exhaust treatment component of the work vehicle between the front and rear support arms.

In another aspect, the present subject matter is directed to a hood support assembly for a work vehicle. The hood support assembly may generally include a support frame having a front support arm, a rear support arm and a hood support plate coupled between the front and rear support arms. The support frame may further include a first angled mounting bracket and a second angled mounting bracket. The first angled mounting bracket may be coupled to the front support arm and may extend outwardly towards the rear support arm. The second angled mounting bracket may be coupled to the rear support arm and may extend outwardly towards the front support arm. The hood support assembly may also include a removable mounting cradle coupled between the first and second mounting brackets. The mounting cradle may include a first angled mounting flange configured to be coupled to the first angled mounting bracket and a second angled mounting flange configured to be coupled to the second angled mounting bracket such that an angled interface is defined between the first and second angled mounting brackets and the first and second angled mounting flanges when the mounting cradle is coupled to the support frame. The mounting cradle may be configured to vertically support a diesel oxidation catalyst (DOC) module of the work vehicle between the front and rear support arms. In addition, the first and second mounting flanges may be configured to define a non-zero angle relative to a longitudinal axis of the DOC module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a hood support assembly for a work vehicle that is configured to support the vehicle's hood while also accommodating various under-hood components of the work vehicle, such as one or more exhaust treatment system components and/or one or more air intake system components of the work vehicle. Specifically, in several embodiments, the hood support assembly may include a support frame configured to be mounted directly above the vehicle's engine that is formed from various structural components. For example, the support frame may include a hood support plate configured to support various hood-related components for pivotally coupling the vehicle's hood to the frame. In addition, the support frame may include various mounting brackets, flanges and/or any other suitable components for mounting one or more of the vehicle's under-hood components to the frame. For instance, the frame may include a pair of angled mounting brackets configured to be secured to corresponding angled mounting brackets of a removable mounting cage or cradle. The mounting cradle may, in turn, be configured to support a diesel oxidation catalyst (DOC) module of the vehicle's exhaust treatment system at a location directly adjacent to the engine. The support frame may also include a mounting bracket for mounting an air filter of the vehicle's air intake system to the frame. Moreover, the support frame may include various other secondary mounting brackets and/or flanges for mounting any other suitable under-hood components to the frame, such as one or more cables, lines, harnesses, filters, sensors and/or the like.

As will be described below, the disclosed hood support assembly may be pre-assembled during the vehicle manufacturing process as a sub-assembly by installing the hood-related components, the DOC module, the air filter and/or any other suitable under-hood components onto the support frame. The entire sub-assembly may then be installed as a single unit within the under-hood compartment of a work vehicle, thereby reducing the overall amount of manufacturing time as well as the associated costs.

In addition, the removable mounting cradle of the hood support assembly may be used to simplify the process of removing and/or reinstalling a DOC module within a work vehicle. Specifically, as will be described below, an angled interface may be defined between the mounting cradle and the support frame that allows the cradle (with the DOC module installed therein) to be quickly and easily removed from and/or reinstalled within the under-hood compartment without necessitating removal of the vehicle's hood and/or any unrelated under-hood components.

Figure 1:
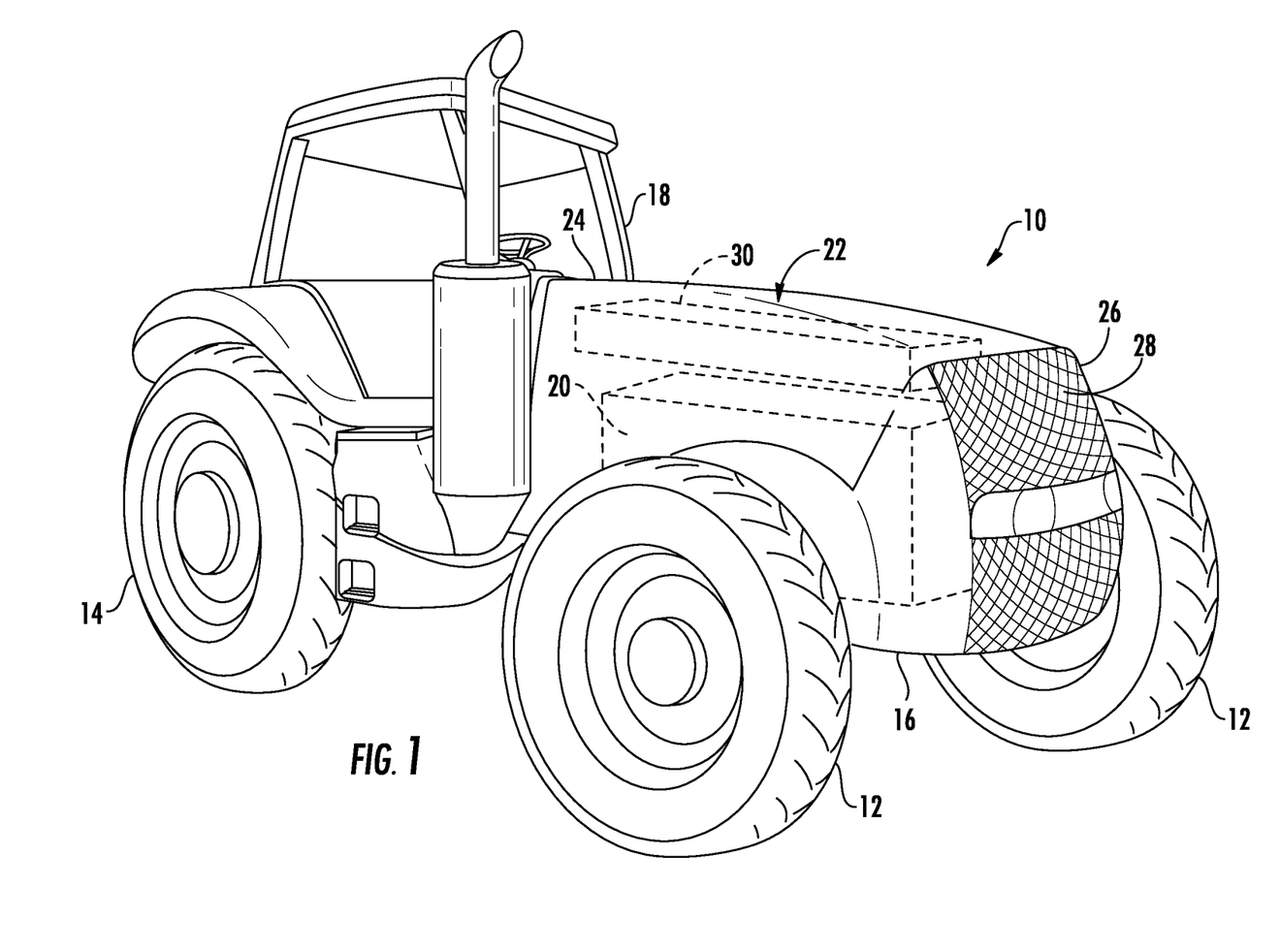
FIG. 1 illustrates a perspective view of one embodiment of a work vehicle.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles (e.g., combines), earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 20 and a transmission (not shown) mounted on the chassis 16. The transmission may be operably coupled to the engine 20 and may provide variably adjusted gear ratios for transferring engine power to the wheels 14 via a differential (not shown).

The work vehicle 10 may also include a hood 22 configured to extend between an aft end 24 disposed adjacent to the cab 18 and a forward end 26 defining a grille 28 at the front of the work vehicle 10. As is generally understood, the hood 22 may be configured to least partially surround and/or cover the various under-hood components stored within the vehicle's under-hood compartment, such as the engine 20 and any other suitable under-hood components (e.g., hydraulic components, pneumatic components, electrical components, mechanical component(s), storage tank(s), etc.). A hood support assembly 30 may also be installed within the under-hood compartment for supporting the hood 22 relative to the engine 22 and/or any other suitable under-hood components. For instance, as shown in FIG. 1, the hood support assembly 30 may be installed directly above the engine 22. As will be described below, in addition to supporting the hood 22, the hood support assembly 30 may also be configured to provide support for one or more of the vehicle's under-hood components, such as an exhaust treatment system component and/or an air intake system component of the work vehicle.

Figure 2:
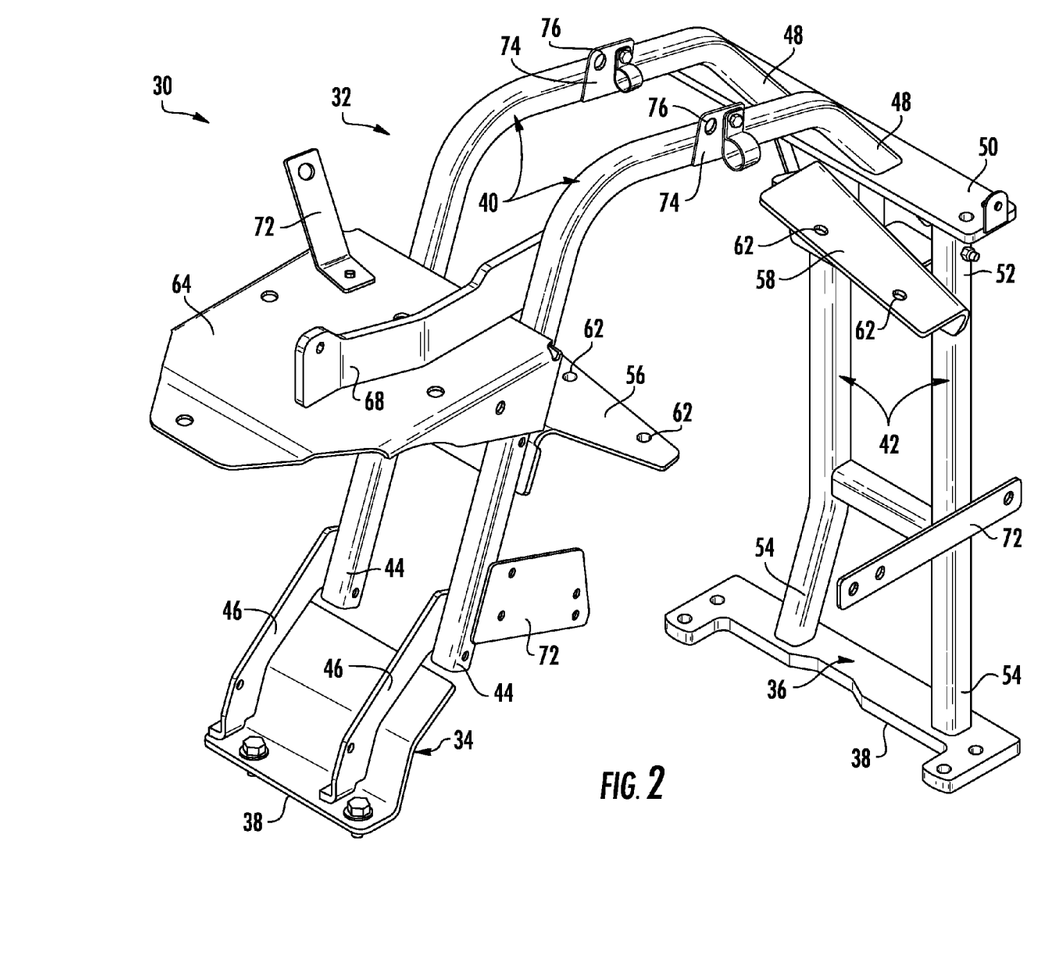
FIG. 2 illustrates a perspective view of one embodiment of various components that may be included within a hood support assembly for a work vehicle in accordance with aspects of the present subject matter, particularly illustrating a support frame of the hood support assembly.

Referring now to FIG. 2, a perspective view of one embodiment of various components that may be included within a hood support assembly 30 suitable for use with a work vehicle 10 is illustrated in accordance with aspects of the present subject matter. As shown, the hood support assembly 30 may include a support frame 32 configured to be mounted within the vehicle's under-hood compartment for pivotally and/or vertically supporting the hood 22 relative to the various under-hood components of the work vehicle 10. In general, the support frame 32 may include any number of structural components and/or features configured to be secured to one another so as to form a desired profile/shape for allowing the frame 32 to be properly installed within the limited storage space of the vehicle's under-hood compartment. In addition, the structural components and/or features may also be configured to add strength and/or rigidity to the support frame 32.

In several embodiments, the support frame 32 may include a front attachment member 34 and a rear attachment member 36. In general, each attachment member 34, 36 may be configured to be rigidly mounted to a structural under-hood component of the work vehicle 10, such as a portion of the engine 22 (e.g., the engine chassis), the vehicle's chassis 16 and/or any other suitable component. As shown, each attachment member 34, 36 may define a flat or planar attachment surface 38 configured to be positioned onto (and/or seated flush against) the component to which the attachment members 34, 36 are being secured. Suitable mechanical fasteners (e.g., bolts, screws, pins, rivets, etc.) may then be utilized to secure each attachment member 34, 36 to the corresponding under-hood component(s), such as by inserting fastening bolts through the attachment surfaces 38 and into the corresponding under-hood component(s).

In addition, the support frame 32 may include a pair of front support arms 40 and a pair of rear support arms 42 extending between the front and rear attachment members 34, 36. Specifically, the front support arms 34 may each extend lengthwise between a first end 44 coupled to the front attachment member 34 (e.g., via suitable connector arms 46) and a second end 48 coupled to a hood support plate 50 of the support frame 32. Additionally, each rear support arm 43 may also extend lengthwise between a first end 52 and a second end 54, with the first end 52 being coupled to the hood support plate 50 and the second end 54 being coupled to the rear attachment member 36.

In several embodiments, the support arms 42, 44 may correspond to the primary structural components of the support frame 32 and, thus, may be configured to provide increased strength and/or rigidity to the frame 32. For instance, in one embodiment, the support arms 42, 44 may correspond to rigid tube-like structural members. In addition, the shape/profile of the support arms 42, 44 may be adapted to ensure proper clearance between the support frame 32 and one or more adjacent under-hood components and/or to accommodate the storage of one or more suitable under-hood components. For example, as shown in FIG. 2, the front support arms 42 may be configured to define a curved or upside-down "J-shaped" profile between their first and second ends 44, 48 such that the support arms 40, 42 and the attachment members 34, 36 collectively form a generally "U-shaped" frame. As will be described below, such a "U-shaped" frame may allow for an exhaust treatment system component of the work vehicle 10 (e.g., a DOC module) to be installed between the front and rear support arms 40, 42.

The disclosed hood support assembly 30 may also include various mounting flanges and/or brackets for mounting various under-hood components to the support frame 32. For example, the hood support assembly 30 may include first and second angled mounting brackets 56, 58 configured to allow a corresponding mounting cage or cradle 60 (FIGS. 3 and 4) to be secured to the support frame 32. Specifically, as shown in FIG. 2, the first angled mounting bracket 56 may be mounted to the front support arms 40 such that the bracket 56 extends rearward towards the rear support arms 32. Similarly, the second angled mounting bracket 58 may be mounted to the rear support arms 42 such that the bracket 58 extends forward towards the front support arms 40. Additionally, as shown in FIG. 2, each mounting bracket 56, 58 may define one or more suitable fastener openings 62 configured to receive one or more corresponding mechanical fasteners (e.g., screws, bolts, pins, rivets and/or the like). Such mechanical fasteners may allow for the disclosed mounting cradle 60 to be mounted to the angled mounted brackets 56, 58 so as to position the cradle 60 within the space defined between the front and rear support arms 40, 42.

Moreover, as shown in FIG. 2, the hood support assembly 30 may include a forward mounting bracket 64 configured to allow one or more under-hood components of the work vehicle 10 to be secured to the support frame 32 at location forward of the front support arms 40. For instance, in several embodiments, an air filter 66 (FIG. 8) of the vehicle's air intake system may be configured to be mounted to the forward mounting bracket 64 such that the filter 66 extends downwardly from the mounting bracket 64 so as to occupy the space defined between the bracket 64 and the front attachment member 34.

Further, as shown in FIG. 2, the hood support assembly 30 may also include various other mounting brackets and/or flanges. For instance, as will be described below, the hood support assembly 30 may include a cylinder bracket 68 coupled to the support frame 32 (e.g., by coupling the bracket 68 to one of the forward support arms 40) that is configured to be secured to a hood cylinder 70 (FIGS. 6 and 7) adapted to assist in raising and lowering the vehicle's hood 22. Similarly, as shown in FIG. 2, additional mounting brackets 72 may be provided to couple various other under-hood components to the support frame 32, such as various cables, harnesses and/or lines (e.g., cooling lines), one or more sensors (e.g., a NOx sensor(s)), any other filters (e.g., a crank case ventilation filter) and/or any other suitable under-hood components.

Additionally, the hood support assembly 30 may, in several embodiments, include installation brackets 74 mounted to the support frame 32, such as at the top of the front support arms 40. As shown in FIG. 2, the installation brackets 74 may define suitable openings 76 for coupling the brackets 74 to chains, cables and/or any other suitable means for raising and/or lowering the hood support assembly 30. Thus, by assembling the various components of the hood support assembly 30 into a sub-assembly, the entire sub-assembly may be quickly and easily raised/lowered into place within a work vehicle during the vehicle manufacturing process.

It should be appreciated that the dimensions, thicknesses, materials and/or geometries of the various components of the support frame 32 may be selected to ensure that the support assembly 30 will endure the often harsh operating conditions of the associated work vehicle 10 while also maintaining the required structural support for the various components configured to be mounted to the frame 32.

Figure 3:
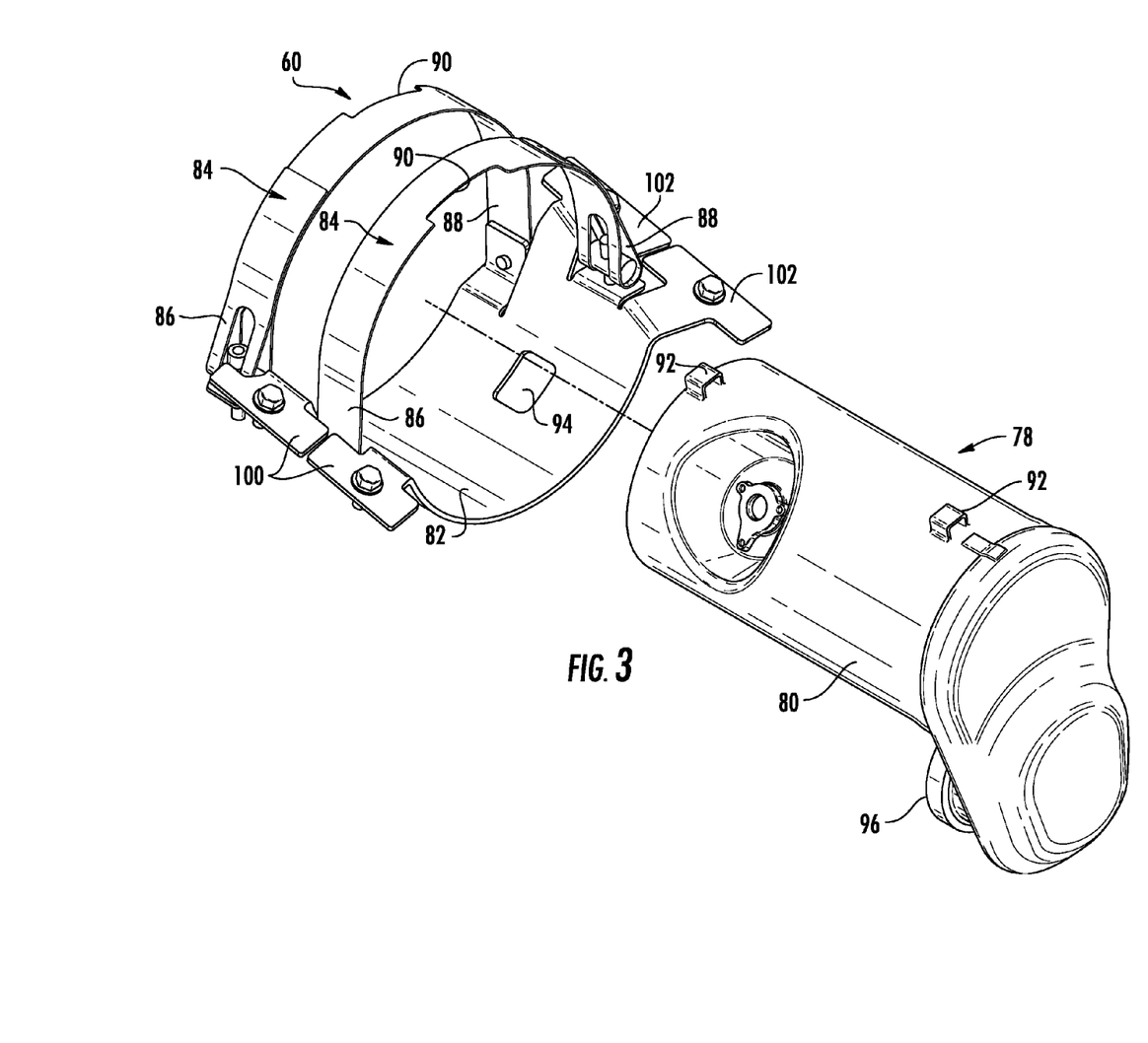
FIG. 3 illustrates a perspective view of one embodiment of a mounting cradle suitable for use within the disclosed hood support assembly for supporting a diesel oxidation catalyst (DOC) module of a work vehicle in accordance with aspects of the present subject matter, particularly illustrating the DOC module exploded away from the mounting cradle.
Figure 4:
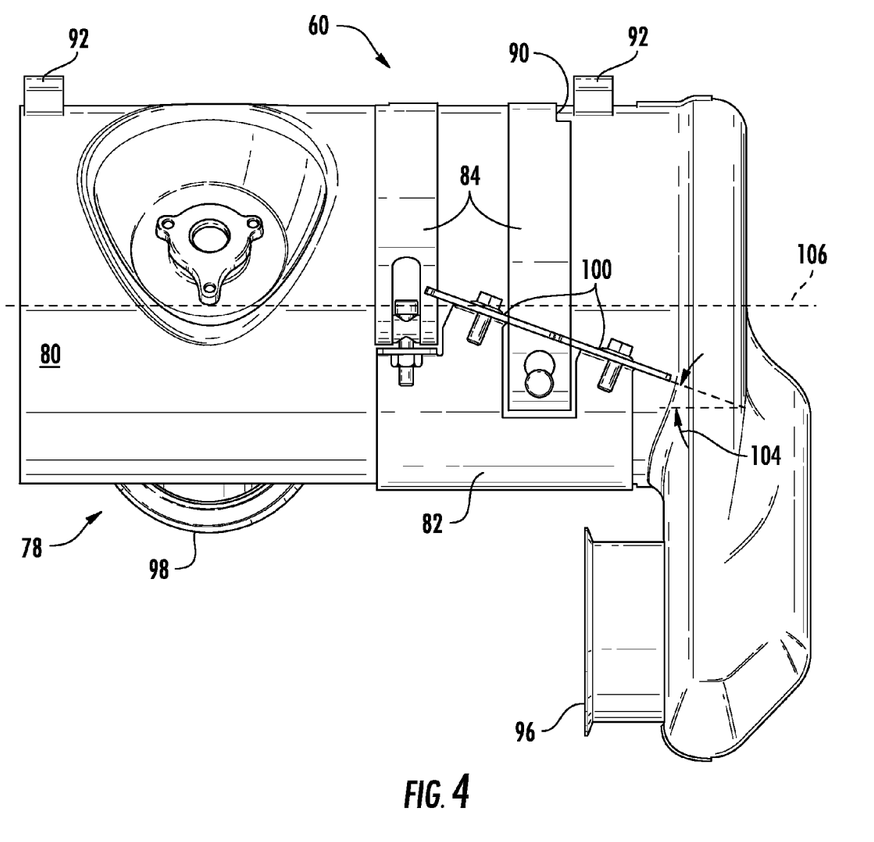
FIG. 4 illustrates a front view of the mounting cradle shown in FIG. 3 with the DOC module installed therein.

Referring now to FIGS. 3 and 4, one embodiment of a suitable mounting cage or cradle 60 for supporting an exhaust treatment system component of a work vehicle 10 is illustrated in accordance with aspects of the present subject matter. Specifically, FIG. 3 illustrates a perspective view of the mounting cradle 60 with the exhaust treatment system component being exploded away from the cradle 60. Additionally, FIG. 4 illustrates a front view of the mounting cradle 60 with the exhaust treatment system component installed therein.

In several embodiments, the mounting cradle 60 may be designed to support a DOC canister or module 78 of the vehicle's exhaust treatment system. For example, as shown in FIGS. 3 and 4, the DOC module 78 may include a housing 80 having generally cylindrical shape. As such, the mounting cradle 60 may be specifically configured to accommodate the cylindrical shape of the DOC housing 80. For instance as shown in FIG. 3, the mounting cradle 60 may include a curved or arcuate lower cradle portion 82 having a radius of curvature generally corresponding to the radius of the cylindrical-shaped housing 80. Thus, when the DOC module 78 is positioned within the mounting cradle 60, the lower cradle portion 82 may extend partially around the circumference of the DOC module 78 (e.g., around the lower half) to provide vertical support to the module 78. In addition, as shown in FIGS. 3 and 4, the mounting cradle 60 may also include one or more retention straps 84 configured to extend around the top of the DOC module 78 so as to retain the module 78 within the cradle 30. Specifically, each retention strap 84 may extend lengthwise between a first end 86 configured to be coupled to one side of the lower cradle portion 82 and a second end 88 configured to be coupled to the other side of the lower cradle portion 82. Thus, when the DOC module 78 is positioned within the mounting cradle 60, each retention strap 84 may be positioned or wrapped around the upper circumference of the DOC module 78 and subsequently secured to the lower cradle portion 82 at each of its ends 86, 88.

It should be appreciated that the retention straps 84 may generally be formed from any suitable material. For instance, in one embodiment, the straps 84 may be formed from a thin strip of metal. Alternatively, the straps 84 may be formed from any other suitable material, such as an elastic material.

In addition, the mounting cradle 60 may also include one or more positioning features to ensure that the DOC module 78 is properly oriented within the cradle 60. For example, as shown in FIG. 3, one or more locating notches 90 may be defined within one or more of the retention straps 84 that are configured to be aligned with one or more corresponding locating tabs 92 (FIG. 4) extending outwardly from the DOC module 78. Moreover, one or more alignment openings 94 may be defined in the lower cradle portion 82 that are configured to receive corresponding alignment projections (not shown) extending outwardly from the DOC module 87. Thus, when installing the DOC module 78 within the mounting cradle 60, the DOC module 78 may be rotated or otherwise moved so as to properly align the corresponding positioning feature(s) defined on the components, thereby ensuring that the module 78 will be oriented correctly relative to the engine 22 when the mounting cradle 60 is mounted onto the support frame 32.

It should be appreciated by those of ordinary skill in the art that the DOC module 78 may generally have any suitable configuration that allows it function as described herein so as to reduce the amount of harmful engine emissions released into the surrounding environment. For example, the DOC housing 80 may be configured to house one or more catalysts (not shown) that serve to oxidize carbon monoxide and unburnt hydrocarbons contained within engine exhaust received from the vehicle's engine. For example, as shown in FIG. 4, the DOC module 78 may include an inlet 96 that is configured to receive engine exhaust expelled from the engine's exhaust outlet (not shown). In addition, a mixing chamber (not shown) may be defined within the DOC housing 80 to allow the engine exhaust to be mixed with at least one reductant, such as a diesel exhaust fluid (DEF) reductant or any other suitable urea-based reductant, supplied into the housing 80. The resulting mixture may then be discharged from the DOC housing (e.g., via a suitable outlet 98) and subsequently directed to a downstream component of the vehicle's exhaust treatment system (e.g., a selective catalytic reduction (SCR) module).

It should also be appreciated that, in other embodiments, any other suitable exhaust treatment system component(s) may be configured to be supported within the mounting cradle 60. Alternatively, the mounting cradle 60 may be configured to support any non-exhaust related components of the work vehicle, such as air intake system components and/or any other suitable under-hood components.

Referring still to FIGS. 3 and 4, the mounting cradle 60 may also include angled mounting flanges 100, 102 configured to allow the cradle 60 to be secured to the corresponding angled mounting brackets 56, 68 associated with the support frame 32. Specifically, the mounting cradle 60 may include one or more first angled mounting flanges 100 configured to be coupled to the first angled mounting bracket 56 (e.g., via suitable fasteners) and one or more second angled mounting flanges 102 configured to be coupled to the second angled mounting bracket 58 (e.g., via suitable fasteners).

As particularly shown in FIG. 4, the mounting flanges 100, 102 may generally be configured to define a non-zero angle 104 relative to a longitudinal axis 106 of the DOC module 78 (and/or relative to the ground when installed on the vehicle 10). For example, in several embodiments, the angle 104 may generally range from about 5 degrees to about 45 degrees, such as from about 10 degrees to about 40 degrees or from about 15 degrees to about 35 degrees and any other subranges therebetween. The angle 104 defined by the mounting flanges 100, 102 may generally be configured to match the angle (not shown) defined by the angled mounting brackets 56, 58. For example, in a particular embodiment, the angles defined by the mounting brackets/flanges 56, 58, 100, 102 may be configured such that, when the mounting cradle 60 (with the DOC module 78 installed therein) is mounted onto the mounting brackets 56, 58, the longitudinal axis 106 of the DOC module 78 is oriented generally horizontal (e.g., by extending parallel to the ground when the hood support assembly 30 is installed within the vehicle 10).

Figure 5:
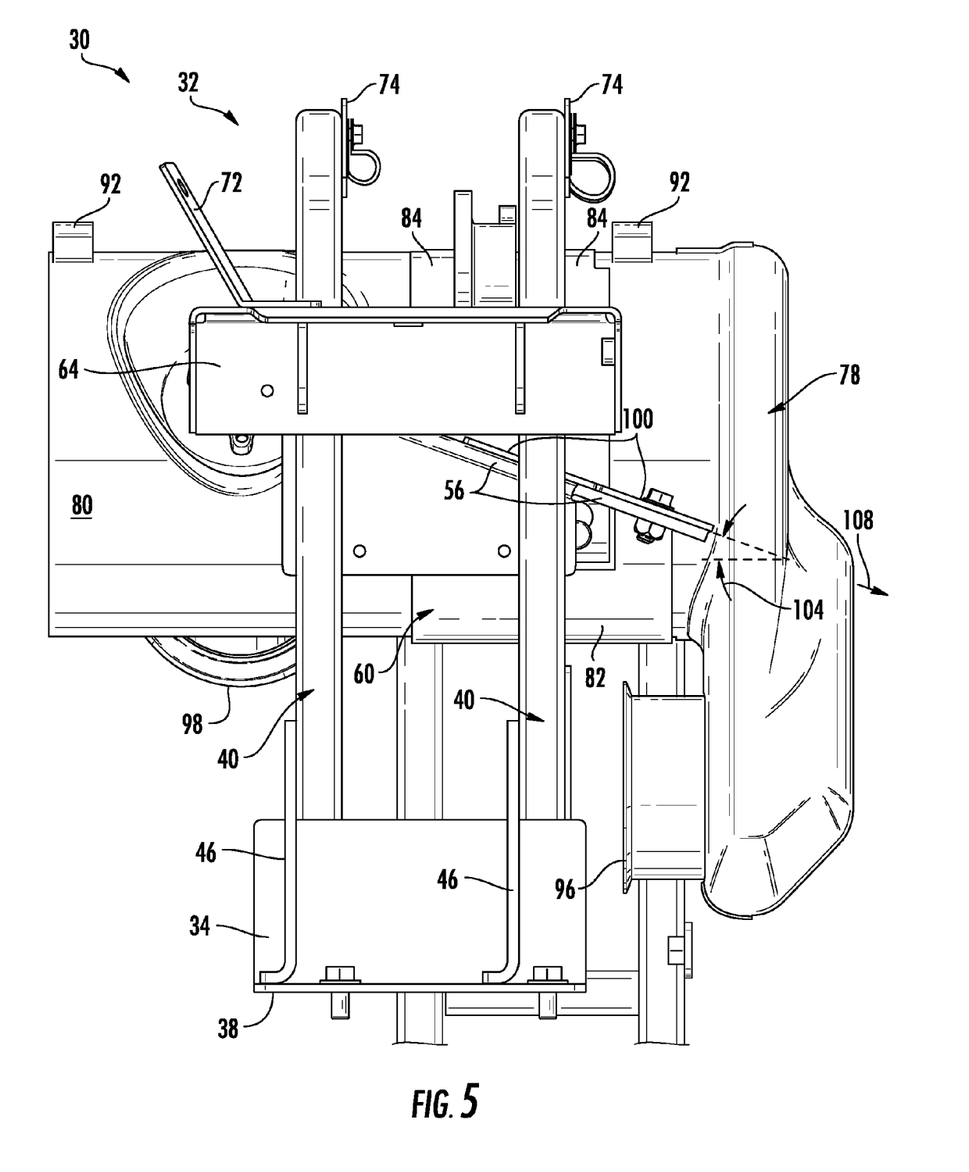
FIG. 5 illustrates a front view of the support frame shown in FIG. 2 with the mounting cradle and DOC module shown in FIGS. 3 and 4 installed therein.

By providing such an angled interface between the mounting brackets 56, 58 and the mounting flanges 100, 102, the mounting cradle 60 (along the with the DOC module 78) may be quickly and easily installed onto the support frame 32 and/or removed from the frame 32 without requiring the removal of the vehicle's hood 22 and/or any other non-related under-hood components. For example, FIG. 5 illustrates a front view of the support frame 32 with the mounting cradle 60 (and DOC module 78) installed thereon. As indicated by arrow 108 in FIG. 5, the mounting cradle 60 and DOC module 78 may be removed from the support frame 32 by sliding the cradle/module 60, 78 downward along the angled interface defined between the mounting brackets 56, 58 and the mounting flanges 100, 102. The mounting cradle 60 and DOC module 78 may then be lifted out from the vehicle's under-hood compartment without contacting any of the vehicle's other under-hood components.

Figure 6:
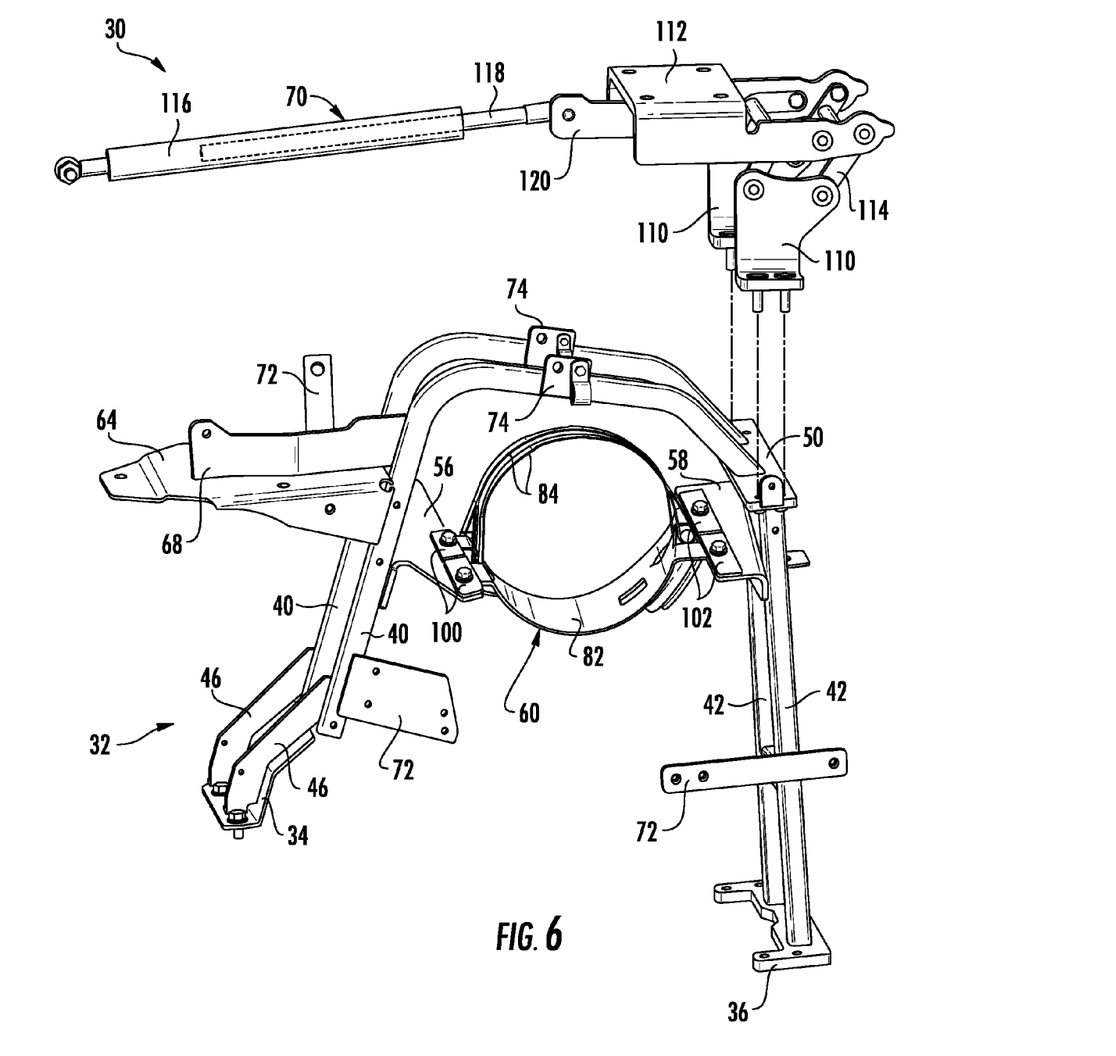
FIG. 6 illustrates another perspective view of the support frame shown in FIG. 2 with the mounting cradle shown in FIG. 3 secured thereto and further illustrates various hood-related components of the hood support assembly exploded away from the support frame.
Figure 7:
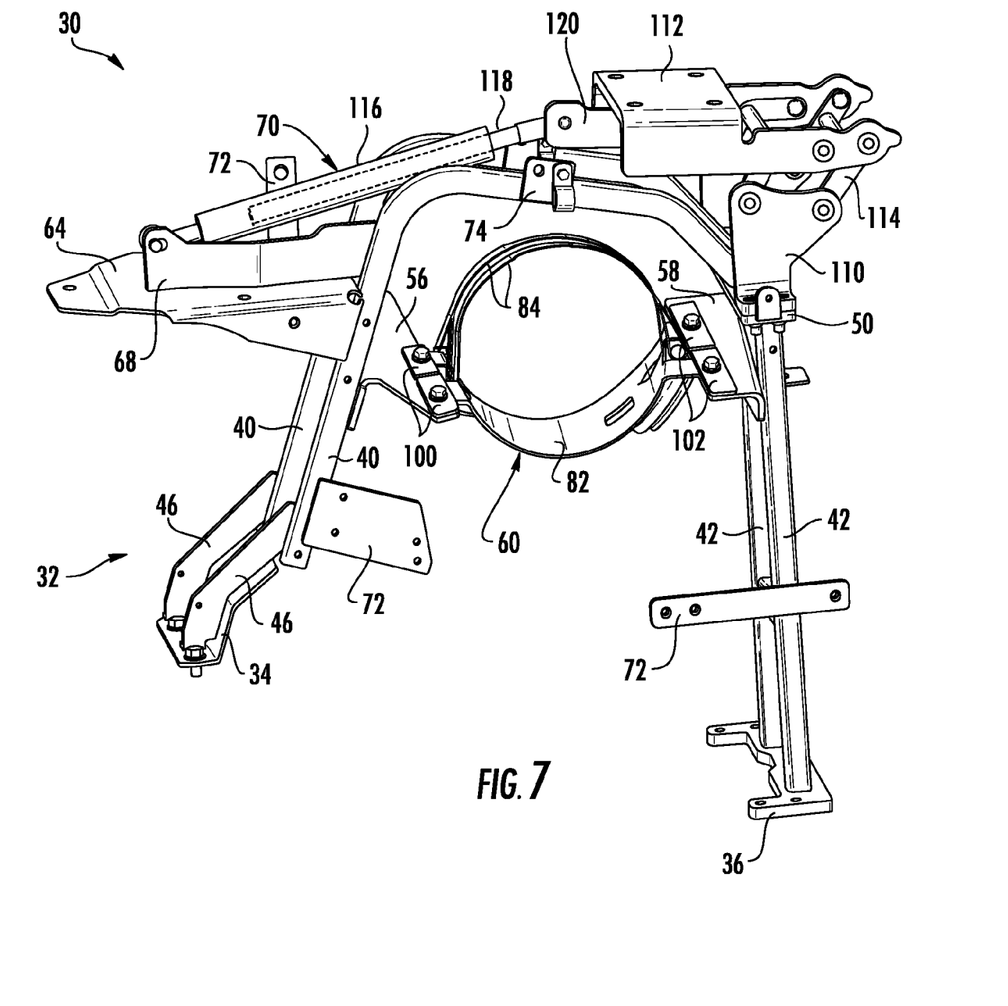
FIG. 7 illustrates a similar perspective view to that shown in FIG. 6 with the various hood-related components being installed onto the support frame.

Referring now to FIGS. 6 and 7, views of various hood mounting components configured for attachment to the support frame 32 are illustrated in accordance with aspects of the present subject matter. Specifically, FIG. 6 illustrates a perspective view of the hood mounting components exploded away from the support frame 32. Additionally, FIG. 7 illustrates a perspective view of the hood mounting components installed onto the support frame 62. FIGS. 6 and 7 also illustrate the mounting cradle 60 installed onto the support frame 32 with the DOC module 78 removed therefrom.

As shown in FIGS. 6 and 7, the various hood mounting components may generally be configured to be coupled to and/or supported by the hood support plate 50 of the support frame 32. Specifically, as shown in FIG. 7, the hood mounting components may include a pair of base brackets 110 configured to be mounted to opposite ends of the hood mounting plate 50 (e.g., via suitable mechanical fasteners). In addition, the hood mounting components may include a hood mounting plate 112 pivotally coupled to the base brackets 110 via a suitable hinge(s) 114. The hood mounting plate 112 may, in turn, be configured to be coupled to the vehicle's hood 22. Thus, when opening the hood 22, both the hood 22 and the hood mounting plate 112 may be rotated or pivoted upward relative to the base brackets 110.

Moreover, the hood mounting components may also include a hood cylinder 70 configured to assist in opening and/or closing the hood 22. In general, the hood cylinder 70 may correspond to any suitable cylinder-like actuator, such as a pneumatic or air cylinder. For instance, the hood cylinder 70 may correspond to passive air cylinder that is configured to maintain the hood 22 at a predetermined position or height when the hood 22 is opened. As shown in FIGS. 6 and 7, the hood cylinder 70 may include a cylinder barrel 116 and a cylinder rod 118 configured to be received within and/or actuated relative to the cylinder barrel 116, with the cylinder barrel 116 being coupled to the cylinder mounting bracket 68 associated with the support frame 32 and the cylinder rod 118 being coupled to the hood mounting plate 112 (e.g., via a separate bracket 120). Thus, when the hood mounting plate 112 is rotated via the hinge(s) 114 when opening and closing the hood 22, the hood cylinder 70 may be actuated via extension and/or retraction of the rod 118 relative to the barrel 116.

Figure 8:
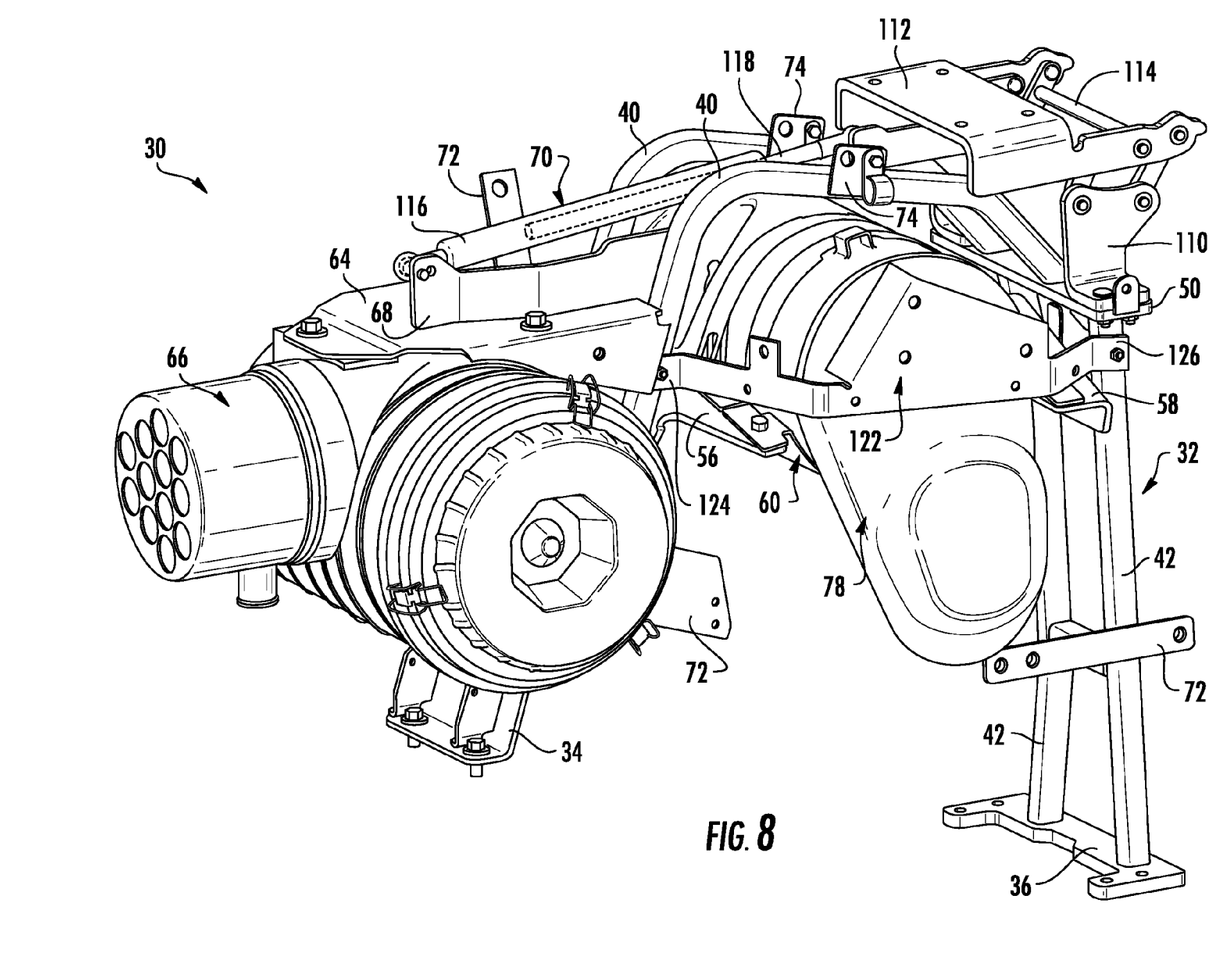
FIG. 8 illustrates a perspective view of one embodiment of an assembled hood support assembly in accordance with aspects of the present subject matter, particularly illustrating the mounting cradle and DOC module shown in FIGS. 3 and 4, the hood-related components shown in FIGS. 6 and 7 and an air filter installed onto the support frame.

Referring now to FIG. 8, a perspective view of one embodiment of an assembled hood support assembly 30 is illustrated in accordance with aspects of the present subject matter. Specifically, as indicated above, an air filter 66 of the vehicle's air intake system may be mounted to the forward mounting bracket 64 such that the filter 66 extends within the space defined between the mounting bracket 64 and the front attachment member 34. In addition, the various hood mounting components (e.g., the base brackets 110, the hood mounting plate 112, the hinge(s) 114 and/or the hood cylinder 70) may also be installed onto the support frame 32 via the hood support plate 50 and/or the cylinder mounting bracket 68 while the mounting cradle/DOC module 60, 78 may be installed onto the support frame 32 via the angled mounting brackets 58, 58. As shown in FIG. 8, a retention bracket 122 may also be coupled to the support frame 32 after installing the mounting cradle 60 and DOC module 78 to prevent lateral motion of the DOC module 78 relative to the mounting cradle 60. For example, as shown in the illustrated embodiment, the retention bracket 122 may include a first end 124 coupled to one of the front support arms 40 and a second end 126 coupled to one of the rear support arms 42 such that the bracket 122 extends across an end of the DOC module 78.

As indicated above, the hood-support assembly 30 may be pre-assembled as a sub-assembly during the vehicle manufacturing process. Thus, upon pre-assembling the various assembly components, the entire sub-assembly may be lifted via the installation brackets 74 and subsequently lowered down into its appropriate position within the under-hood compartment, thereby reducing assembly times as well as the associated costs.

It should be appreciated that, in addition to the various components shown in FIG. 8 or as an alternative thereto, any other suitable under-hood components may be included within or otherwise form part of the disclosed hood support assembly 30. For instance, as indicated above, various under-hood components, such as one or more cables, harnesses, lines, sensors, filters and/or the like, may be configured to be coupled to the support frame 32 via one or more suitable mounting brackets and/or flanges so as to form part of the hood-support assembly 30. As another example, an exhaust conduit (not shown) designed to be coupled between the engine's exhaust outlet and the inlet 96 of the DOC module 87 may be installed onto the DOC module 78 as a part of the overall hood support assembly 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hood support assembly for a work vehicle, the hood support assembly comprising:
    a support frame including a front support arm, a rear support arm and a hood support plate coupled between the front and rear support arms, the support frame further including a first mounting bracket and a second mounting bracket, the first mounting bracket being coupled to the front support arm and extending outwardly towards the rear support arm, the second mounting bracket being coupled to the rear support arm and extending outwardly towards the front support arm;
    a removable mounting cradle coupled between the first and second mounting brackets, the mounting cradle including a first mounting flange configured to be coupled to the first mounting bracket and a second mounting flange configured to be coupled to the second mounting bracket,
    wherein the mounting cradle is configured to vertically support an exhaust treatment component of the work vehicle between the front and rear support arms, and wherein an angled interface is defined between the first and second mounting brackets and the first and second mounting flanges when the mounting cradle is coupled to the support frame.

2. The hood support assembly of claim 1, wherein the first and second mounting flanges define a non-zero angle relative to a longitudinal axis of the exhaust treatment component.

3. The hood support assembly of claim 2, wherein the non-zero angle ranges from about 5 degrees to about 45 degrees.

4. The hood support assembly of claim 1, wherein the mounting cradle includes a curved cradle portion configured to receive the exhaust treatment component, and wherein the mounting cradle further includes at least one retention strap configured to extend at least partially around the exhaust treatment component, the at least one retention strap including a first end configured to be coupled to one side of the curved cradle portion and a second end configured to be coupled to an opposite side of the curved cradle portion.

5. The hood support assembly of claim 1, wherein the mounting cradle included at least one positioning feature configured to be aligned with a corresponding positioning feature of the exhaust treatment component when installing the exhaust treatment component within the mounting cradle.

6. The hood support assembly of claim 1, further comprising a hood mounting plate pivotally coupled to the hood support plate, the hood mounting plate configured to be coupled to a hood of the work vehicle.

7. The hood support assembly of claim 6, further comprising a hood cylinder coupled between the hood mounting plate and the support frame.

8. The hood support assembly of claim 1, wherein the support frame further includes a secondary mounting bracket configured to vertically support an air intake component of the work vehicle.

9. The hood support assembly of claim 1, wherein the exhaust treatment component comprises a diesel oxidation catalyst (DOC) module of the work vehicle.

10. A hood support assembly for a work vehicle, the hood support assembly comprising:
a support frame including a front support arm, a rear support arm and a hood support plate coupled between the front and rear support arms, the support frame further including a first angled mounting bracket and a second angled mounting bracket, the first mounting angled bracket being coupled to the front support arm and extending outwardly towards the rear support arm, the second angled mounting bracket being coupled to the rear support arm and extending outwardly towards the front support arm;
a removable mounting cradle coupled between the first and second angled mounting brackets, the mounting cradle including a first angled mounting flange configured to be coupled to the first angled mounting bracket and a second angled mounting flange configured to be coupled to the second mounting bracket such that an angled interface is defined between the first and second angled mounting brackets and the first and second angled mounting flanges when the mounting cradle is coupled to the support frame,
wherein the mounting cradle is configured to vertically support a diesel oxidation catalyst (DOC) module of the work vehicle between the front and rear support arms and wherein the first and second mounting flanges define a non-zero angle relative to a longitudinal axis of the DOC module.

11. The hood support assembly of claim 10, wherein the non-zero angle ranges from about 5 degrees to about 45 degrees.

12. The hood support assembly of claim 10, wherein the mounting cradle includes a curved cradle portion configured to receive a cylindrical housing of the DOC module, and wherein the mounting cradle further includes at least one retention strap configured to extend at least partially around the cylindrical housing, the at least one retention strap having a first end configured to be coupled to one side of the curved cradle portion and a second end configured to be coupled to an opposite side of the curved cradle portion.

13. The hood support assembly of claim 10, wherein the mounting cradle included at least one positioning feature configured to be aligned with a corresponding positioning feature of the DOC module when installing the DOC module within the mounting cradle.

14. The hood support assembly of claim 10, further comprising a hood mounting plate pivotally coupled to the hood support plate, the hood mounting plate configured to be coupled to a hood of the work vehicle.

15. The hood support assembly of claim 14, further comprising a hood cylinder coupled between the hood mounting plate and the support frame.

16. The hood support assembly of claim 10, wherein the support frame further includes a secondary mounting bracket configured to vertically support an air intake component of the work vehicle.

17. The hood support assembly of claim 16, wherein the air intake component comprises an air filter of the work vehicle.

18. A hood support assembly for a work vehicle, the hood support assembly comprising:
a support frame including a front support arm, a rear support arm and a hood support plate coupled between the front and rear support arms, the support frame further including a first mounting bracket and a second mounting bracket, the first mounting bracket being coupled to the front support arm and extending outwardly towards the rear support arm, the second mounting bracket being coupled to the rear support arm and extending outwardly towards the front support arm;
a removable mounting cradle coupled between the first and second mounting brackets, the mounting cradle including a first mounting flange configured to be coupled to the first mounting bracket and a second mounting flange configured to be coupled to the second mounting bracket,
wherein the mounting cradle is configured to vertically support an exhaust treatment component of the work vehicle between the front and rear support arms, and wherein the first and second mounting flanges define a non-zero angle relative to a longitudinal axis of the exhaust treatment component.

19. The hood support assembly of claim 18, wherein the non-zero angle ranges from about 5 degrees to about 45 degrees.

20. A hood support assembly for a work vehicle, the hood support assembly comprising:
a support frame including a front support arm, a rear support arm and a hood support plate coupled between the front and rear support arms, the support frame further including a first mounting bracket and a second mounting bracket, the first mounting bracket being coupled to the front support arm and extending outwardly towards the rear support arm, the second mounting bracket being coupled to the rear support arm and extending outwardly towards the front support arm;
a removable mounting cradle coupled between the first and second mounting brackets, the mounting cradle including a first mounting flange configured to be coupled to the first mounting bracket and a second mounting flange configured to be coupled to the second mounting bracket,
wherein the mounting cradle is configured to vertically support an exhaust treatment component of the work vehicle between the front and rear support arms, wherein the mounting cradle includes a curved cradle portion configured to receive the exhaust treatment component, and wherein the mounting cradle further includes at least one retention strap configured to extend at least partially around the exhaust treatment component, the at least one retention strap including a first end configured to be coupled to one side of the curved cradle portion and a second end configured to be coupled to an opposite side of the curved cradle portion.

21. The hood support assembly of claim 20, wherein the mounting cradle included at least one positioning feature configured to be aligned with a corresponding positioning feature of the exhaust treatment component when installing the exhaust treatment component within the mounting cradle.

* * * * *